United States Patent
Takebayashi

(10) Patent No.: US 12,340,697 B2
(45) Date of Patent: Jun. 24, 2025

(54) SHIP MONITORING SYSTEM, SHIP MONITORING METHOD, AND INFORMATION PROCESSING DEVICE

(71) Applicant: Furuno Electric Co., Ltd., Nishinomiya (JP)

(72) Inventor: Yuichi Takebayashi, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 285 days.

(21) Appl. No.: 18/139,360

(22) Filed: Apr. 26, 2023

(65) Prior Publication Data

US 2023/0260406 A1    Aug. 17, 2023

Related U.S. Application Data

(63) Continuation-in-part of application No. PCT/JP2021/034751, filed on Sep. 22, 2021.

(30) Foreign Application Priority Data

Oct. 26, 2020   (JP) .................. 2020-178634

(51) Int. Cl.
*G08G 3/02* (2006.01)
*B63B 49/00* (2006.01)
(Continued)

(52) U.S. Cl.
CPC .............. *G08G 3/02* (2013.01); *B63B 49/00* (2013.01); *B63B 79/10* (2020.01); *B63B 79/40* (2020.01); *G01S 13/58* (2013.01); *G01S 13/937* (2020.01)

(58) Field of Classification Search
CPC ......... B63B 49/00; B63B 79/10; B63B 79/40; G01S 13/58; G01S 13/937; G08G 3/02
See application file for complete search history.

(56) References Cited

U.S. PATENT DOCUMENTS

2013/0194129 A1*  8/2013  Kojima ............... G01S 13/937
                                                342/179
2017/0284807 A1* 10/2017  Saito ..................... G08G 3/00
(Continued)

FOREIGN PATENT DOCUMENTS

CN          1541380 A      10/2004
JP       2010-145089 A      7/2010
(Continued)

OTHER PUBLICATIONS

International Search Report and Written Opinion mailed on Nov. 2, 2021, received for PCT Application PCT/JP2021/034751, filed on Sep. 22, 2021, 8 pages including English Translation.
(Continued)

*Primary Examiner* — Seth A Silverman
(74) *Attorney, Agent, or Firm* — XSENSUS LLP

(57) ABSTRACT

The present disclosure provides a ship monitoring system capable of appropriately evaluating risks of collisions for a plurality of other ships which constitute a convoy. The ship monitoring system includes a first data generator, a second data generator, and processing circuitry. The first data generator generates first ship data indicative of a position and a velocity of a first ship. The second data generator generates a plurality of second ship data indicative of positions and velocities of a plurality of second ships. The processing circuitry calculates a risk value indicative of a risk of a collision between the first ship and each of the plurality of second ships based on the first ship data and the plurality of second ship data. The processing circuitry determines whether the plurality of second ships are a convoy based on the plurality of second ship data. The processing circuitry selects a representative value from the risk values calculated for the plurality of second ships determined to be the convoy.

16 Claims, 7 Drawing Sheets

(51) Int. Cl.
    *B63B 79/10*     (2020.01)
    *B63B 79/40*     (2020.01)
    *G01S 13/58*     (2006.01)
    *G01S 13/937*     (2020.01)

(56) References Cited

U.S. PATENT DOCUMENTS

| | | | |
|---|---|---|---|
| 2020/0017177 A1* | 1/2020 | Eyal | G05D 1/43 |
| 2020/0294404 A1* | 9/2020 | Bookless | G01S 13/86 |
| 2020/0333781 A1* | 10/2020 | Clarke | G08G 3/02 |
| 2021/0116249 A1* | 4/2021 | Pecota | G09G 5/377 |
| 2023/0406461 A1* | 12/2023 | Uoshita | B63B 49/00 |

FOREIGN PATENT DOCUMENTS

| | | |
|---|---|---|
| WO | 2020/003856 A1 | 1/2020 |
| WO | 2020/008776 A1 | 1/2020 |

OTHER PUBLICATIONS

Imazu et al., "Obstacle Zone by Target and its Expression", The Journal of Japan Institute of Navigation, vol. 107, 2002, pp. 191-197 (7 pages including English Abstract).

Extended European search report issued on Oct. 14, 2024, in corresponding European patent Application No. 21885765.4, 9 pages.

\* cited by examiner

OTHER SHIPS MANAGEMENT DATABASE

| OTHER SHIPS IDENTIFIER | POSITION | VELOCITY | | ... |
| --- | --- | --- | --- | --- |
| | | SPEED | BEARING | |
| 001 | x1,y1 | v1 | d1 | ... |
| 002 | x2,y2 | v2 | d2 | ... |
| 003 | x3,y3 | v3 | d3 | ... |
| | | | | |

EXAMPLE OF INDICATION (CONVENTIONAL)

CONVOY MANAGEMENT DATABASE

| CONVOY IDENTIFIER | OTHER SHIPS IDENTIFIER | RISK VALUE | ... |
|---|---|---|---|
| 001 | 001 | 0.7 | ... |
| | 002 | 0.6 | ... |
| | 003 | 0.3 | ... |

SHIP MONITORING SYSTEM, SHIP MONITORING METHOD, AND INFORMATION PROCESSING DEVICE

CROSS-REFERENCE TO RELATED APPLICATIONS

This application is a bypass continuation-in-part of PCT International Application No. PCT/JP2021/034751, filed Sep. 22, 2021, and which claims priority under 35 U.S.C. § 119 to Japanese Patent Application No. 2020-178634, filed Oct. 26, 2020, the entire contents of each are incorporated herein by reference.

TECHNICAL FIELD

The present disclosure relates to a ship monitoring system, a ship monitoring method, an information processing device, and a program.

BACKGROUND ART

Conventionally, various techniques for evaluating a risk of a collision between ships exist. For example, Nonpatent Document 1 discloses a technique for displaying an OZT (Obstacle Zone by Target).

REFERENCE DOCUMENT(S) OF CONVENTIONAL ART

Patent Document

[Nonpatent Document 1] IMAZU, Hayama, FUKUTO, Junji, and NUMANO, Masayoshi, "Obstacle Zone by Targets and Its Display," The journal of Japan Institute of Navigation, 2002, Vol. 107, pp. 191-197

DESCRIPTION OF THE DISCLOSURE

Problem(s) to be Solved by the Disclosure

Meanwhile, in the conventional technique, the risk of a collision is evaluated individually for each of a plurality of other ships. However, when the plurality of other ships constitute a convoy, it is necessary to avoid the whole convoy, even if a ship with a low collision risk is included in the convoy.

The present disclosure is made in view of the above-described problem, and a main purpose thereof is to provide a ship monitoring system, a ship monitoring method, an information processing device, and a program, which are capable of appropriately evaluating risks of collisions for a plurality of other ships which constitute a convoy.

SUMMARY OF THE DISCLOSURE

In order to solve the above-described problem, a ship monitoring system according to one aspect of the present disclosure includes a first data generator, a second data generator, a risk value calculator, a convoy determinator, and a representative value selector. The first data generator generates first ship data indicative of a position and a velocity of a first ship. The second data generator generates a plurality of second ship data indicative of positions and velocities of a plurality of second ships. The risk value calculator calculates a risk value indicative of a risk of a collision between the first ship and each of the plurality of second ships based on the first ship data and the plurality of second ship data. The convoy determinator determines whether the plurality of second ships are a convoy based on the plurality of second ship data. The representative value selector selects a representative value from the risk values calculated for the plurality of second ships determined to be the convoy.

Further, a ship monitoring method according to another aspect of the present disclosure includes generating, by a first data generator, first ship data indicative of a position and a velocity of a first ship, generating, by a second data generator, a plurality of second ship data indicative of positions and velocities of a plurality of second ships, calculating a risk value indicative of a risk of a collision between the first ship and each of the plurality of second ships based on the first ship data and the plurality of second ship data, determining whether the plurality of second ships are a convoy based on the plurality of second ship data, and selecting a representative value from the risk values calculated for the plurality of second ships determined to be the convoy.

Further, an information processing device according to another aspect of the present disclosure includes a risk value calculator, a convoy determinator, and a representative value selector. The risk value calculator calculates a risk value indicative of a risk of a collision between a first ship and each of a plurality of second ships based on first ship data indicative of a position and a velocity of the first ship, and a plurality of second ship data indicative of positions and velocities of the plurality of second ships. The convoy determinator determines whether the plurality of second ships are a convoy based on the plurality of second ship data. The representative value selector selects a representative value from the risk values calculated for the plurality of second ships determined to be the convoy.

Further, a program according to another aspect of the present disclosure causes a computer to execute processing which includes calculating a risk value indicative of a risk of a collision between a first ship and each of a plurality of second ships based on first ship data indicative of a position and a velocity of the first ship, and a plurality of second ship data indicative of positions and velocities of the plurality of second ships, determining whether the plurality of second ships are a convoy based on the plurality of second ship data, and selecting a representative value from the risk values calculated for the plurality of second ships determined to be the convoy.

Effect of the Disclosure

According to the present disclosure, it becomes possible to appropriately evaluate risks of collisions for a plurality of other ships which constitute a convoy.

MODE FOR CARRYING OUT THE DISCLOSURE

Hereinafter, one embodiment of the present disclosure is described with reference to the drawings.

Figures 1, 2:
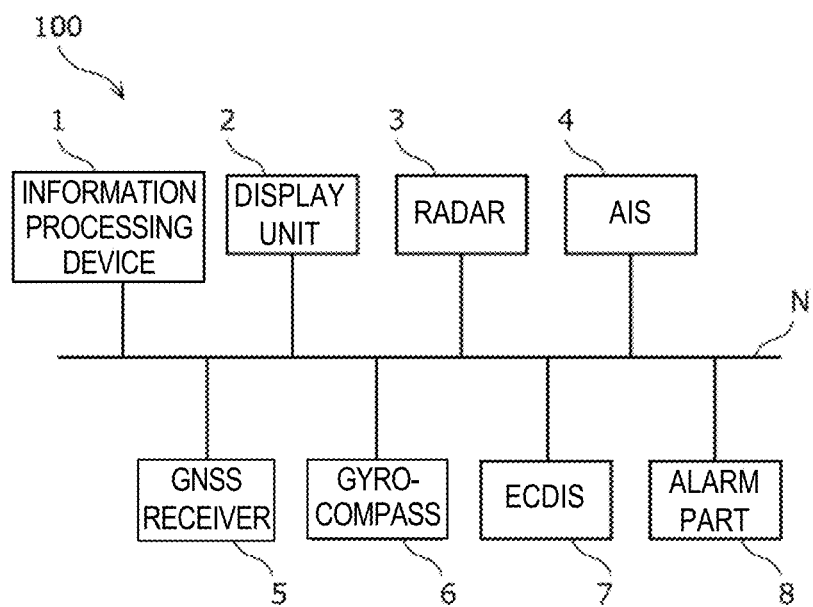
FIG. 1 is a view illustrating one example of a configuration of a ship monitoring system according to one embodiment.
FIG. 2 is a view illustrating one example of other ships management database.

FIG. 1 is a block diagram illustrating one example of a configuration of a ship monitoring system 100 according to this embodiment. The ship monitoring system 100 may be a system which is mounted on a ship and monitors ships which exist around the ship.

The ship on which the ship monitoring system 100 is mounted is one example of a first ship, and is referred to as "the ship" in the following description. Further, ship(s) which exists around the ship is one example of a second ship, and is referred to as "another ship" or "other ships" in the following description.

Moreover, in the following description, a "velocity" is a vector quantity (a so-called "ship velocity vector") indicative of a speed and a direction, and a "speed" is a scalar quantity.

The ship monitoring system 100 may include an information processing device 1, a display unit 2, a radar 3, an AIS 4, a GNSS receiver 5, a gyrocompass 6, an ECDIS 7, and an alarm part 8. These apparatuses may be connected to a network N (for example, LAN) so that mutual network communications are possible.

The information processing device 1 may be a computer including processing circuitry 10, a CPU, a RAM, a ROM, a nonvolatile memory, and an input/output interface. The CPU of the information processing device 1 may perform information processing according to a program loaded to the RAM from the ROM or the nonvolatile memory.

The program may be supplied, for example, via an information storage medium, such as an optical disc or a memory card, and may be supplied, for example, via a communication network, such as the Internet or the LAN.

The display unit 2 may be a display device with a touch sensor, for example. The touch sensor may detect a position in a screen which is specified by a finger etc. The specified position may be inputted not only by the touch sensor but also by a trackball etc.

The radar 3 may transmit a radio wave around the ship, receive a reflection wave thereof, and generate echo data based on a reception signal. Further, the radar 3 may discriminate a target object from the echo data, and generate Target Tracking data (TT data) indicative of a position and a velocity of the target object.

The AIS (Automatic Identification System) 4 may receive AIS data from other ship(s) or a land control which exists around the ship. Without being limited to the AIS, a VDES (VHF Data Exchange System) may also be used. The AIS data may contain a position, a velocity, etc. of another ship.

The GNSS receiver 5 may detect a position of the ship based on the radio wave received from the GNSS (Global Navigation Satellite System). The gyrocompass 6 may detect a heading of the ship. Without being limited to the gyrocompass, a GPS compass or a magnetic compass may also be used.

The ECDIS (Electronic Chart Display and Information System) 7 may acquire the position of the ship from the GNSS receiver 5, and display the position of the ship on an electronic nautical chart. Further, the ECDIS 7 may also display a scheduled route of the ship on the electronic nautical chart. Without being limited to the ECDIS, a GNSS plotter may also be used.

The alarm part 8 may issue an alarm, when there is a risk of a collision between the ship and another ship. For example, the alarm part 8 may give an alarm by indication, or may give an alarm by sound or light. The alarm by indication may be performed by the display unit 2. That is, the display unit 2 may also serve as the alarm part 8.

Although in this embodiment the information processing device 1 is an independent device, without being limited to this configuration, it may be integrated with another device, such as the ECDIS 7. That is, a functional part of the information processing device 1 may be implemented by another device, such as the ECDIS 7.

Further, although the display unit 2 is also an independent device, without being limited to this configuration, a display unit of another device, such as the ECDIS 7, may be used as the display unit 2 which displays an image generated by the information processing device 1.

In this embodiment, a set of the GNSS receiver 5 and the ECDIS 7 is one example of a first data generator, and may generate the ship data indicative of the position and the velocity of the ship. In detail, the GNSS receiver 5 may detect the position of the ship, and the ECDIS 7 may detect the velocity of the ship based on a temporal change in the position of the ship.

Without being limited to this configuration, the velocity of the ship may be detected based on the heading of the ship detected by the gyrocompass 6, and the speed of the ship detected by a ship speed meter (not illustrated).

Further, the radar 3 or the AIS 4 is one example of a second data generator, which generates other-ships data indicative of positions and velocities of other ships. In detail, the TT data generated by the radar 3 may correspond to the other-ships data. Further, the AIS data generated by the AIS 4 may also correspond to the other-ships data.

FIG. 2 is a view illustrating one example of other ships management database built in the memory of the information processing device 1. The other-ships data generated by the radar 3 or the AIS 4 may be registered to the other ships management database.

The other ships management database may include fields comprised of "other ships identifier," "position," "speed," and "bearing." Note that the positions and the bearings of other ships which are detected by the radar 3 may be converted into a coordinate system which is the same as the GNSS.

Figure 3:
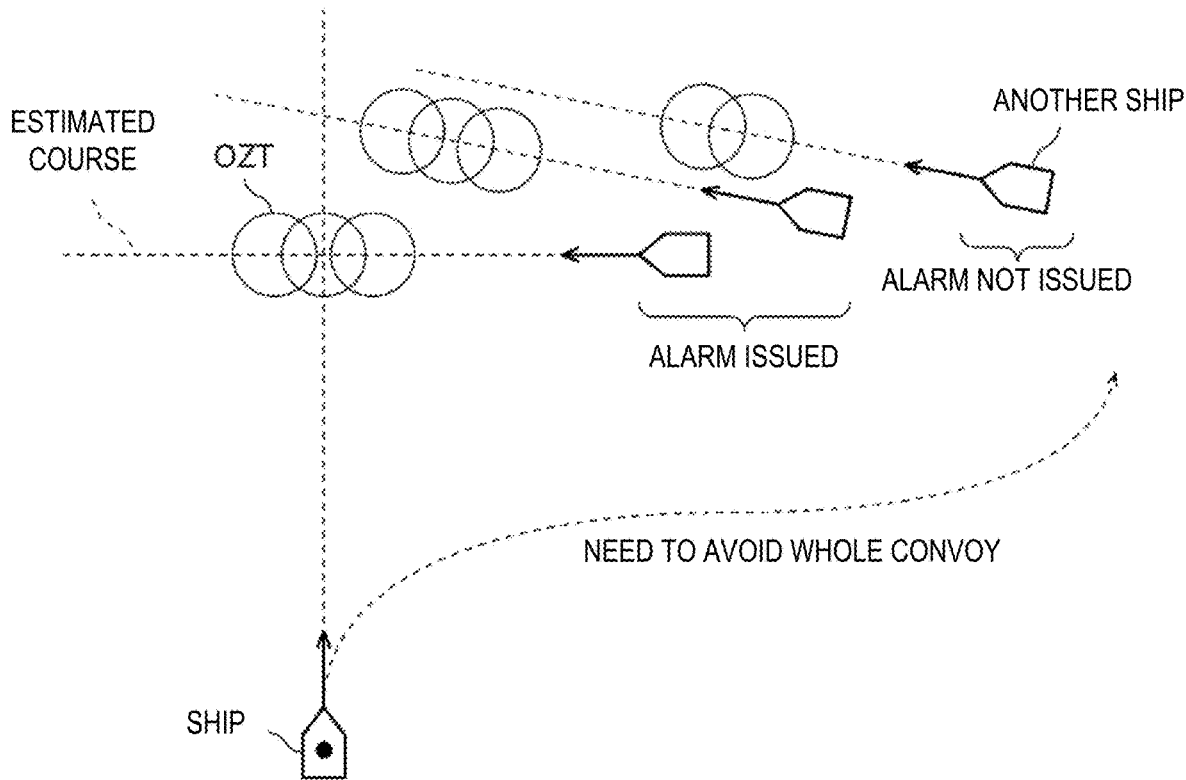
FIG. 3 is a view illustrating one example of indication of an OZT (conventional example).

FIG. 3 is a view illustrating one example of indication of an OZT (conventional example). The OZT may be a zone where cruising of the ship is blocked by another ship, and may be displayed on a schedule course of another ship.

Meanwhile, as illustrated in this drawing, when a group of other ships (convoy) including another ship with a high collision risk exists, it may be necessary to avoid the whole convoy, instead of individually avoiding only another ship with the high collision risk.

However, according to a conventional collision alert, since the risk of a collision is evaluated for each of other ships and an alarm is issued individually, the alarm may be issued only for some of other ships included in the convoy, and the alarm may not be issued for the rest of the convoy, as illustrated in this drawing.

Therefore, this embodiment realizes a management of a plurality of other ships as a convoy, and an issuance of an alarm for the whole convoy, as will be described below.

Figure 4:
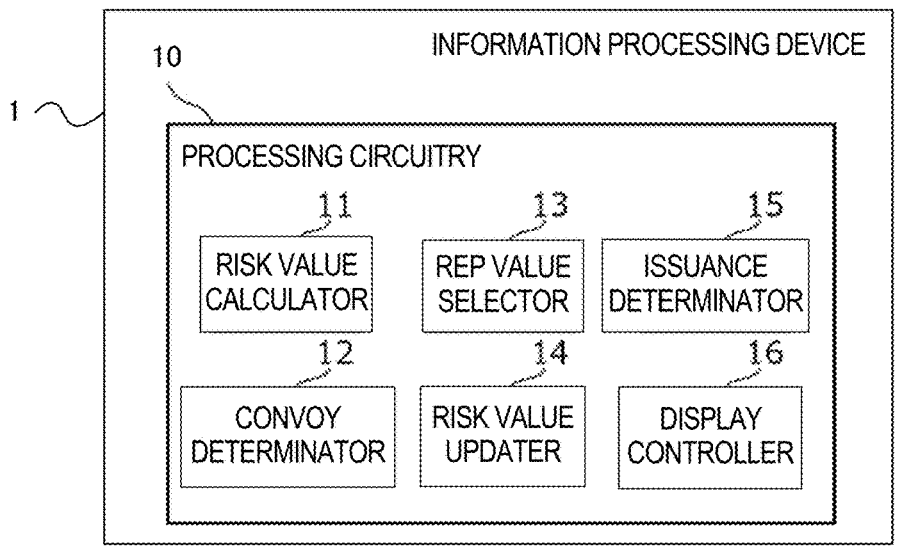
FIG. 4 is a view illustrating one example of a configuration of an information processing device according to this embodiment.

FIG. 4 is a block diagram illustrating one example of a configuration of the information processing device 1 according to this embodiment. The information processing device 1 may include a risk value calculator 11, a convoy determinator 12, a representative value selector 13, a risk value updater 14, an issuance determinator 15, and a display controller 16. These functional parts may be implemented by the CPU of the information processing device 1 performing information processing according to the program.

Figures 5, 6:
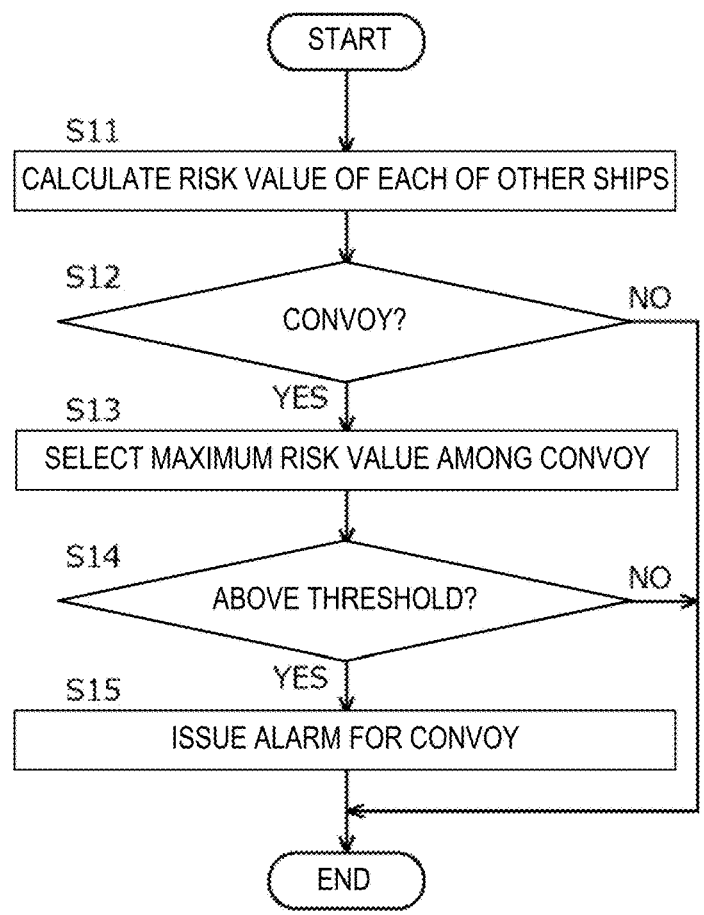
FIG. 5 is a view illustrating one example of a convoy management database.
FIG. 6 is a view illustrating one example of a procedure of issuance determination processing.

FIG. 5 is a view illustrating one example of a convoy management database for managing a plurality of other ships determined by the convoy determinator 12 to be a convoy. The convoy management database may include fields comprised of "convoy identifier," "other ships identifier," and "risk value." Note that the convoy management database may be integrated with the above-described other ships management database (see FIG. 2).

The "convoy identifier" may be an identifier for identifying a convoy. The same convoy identifier may be given to each of the plurality of other ships determined by the convoy determinator 12 to be a convoy. The "risk value" may indicate a risk value calculated by the risk value calculator 11, or a risk value updated by the risk value updater 14.

Figure 7:
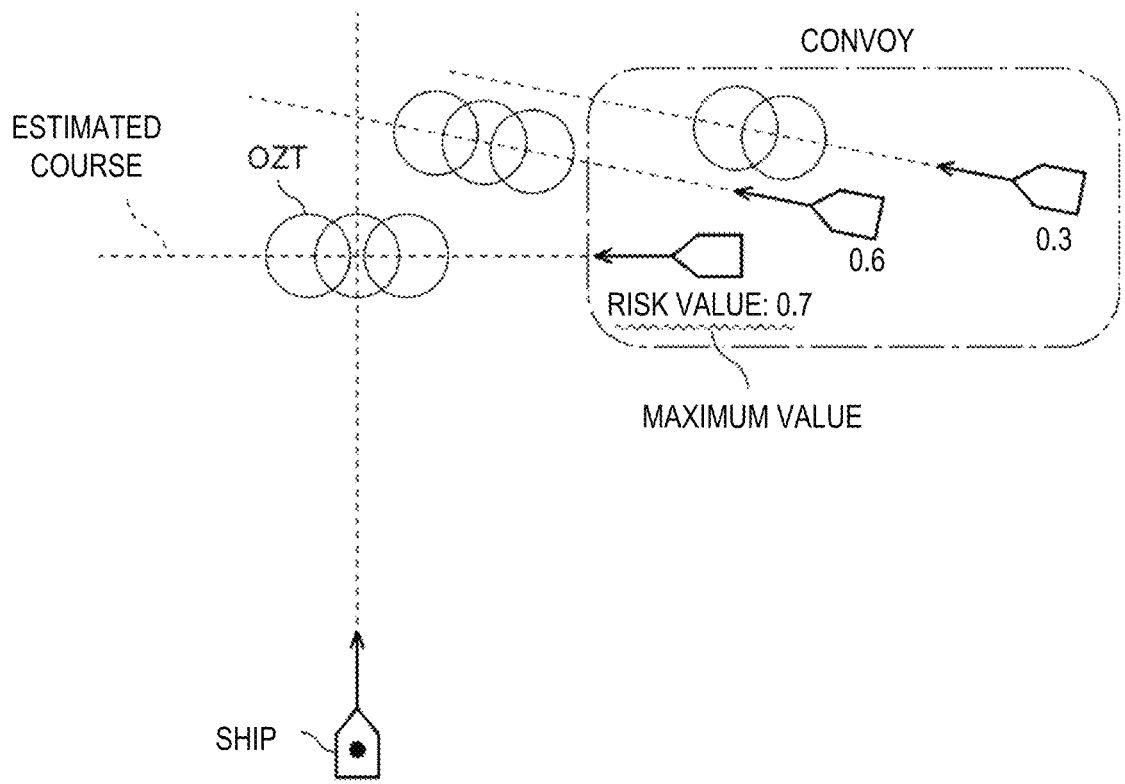
FIG. 7 is a view illustrating one example of the issuance determination.

FIG. 6 is a flowchart illustrating one example of a procedure of issuance determination processing of the ship monitoring method according to this embodiment, which is implemented by the ship monitoring system 100. The information processing device 1 may perform information processing illustrated in this drawing according to the program. FIG. 7 is a view illustrating one example of the issuance determination.

First, the information processing device 1 may calculate a risk value indicative of a risk of a collision between the ship and each of the plurality of other ships based on the ship data and other-ships data (S11: processing as the risk value calculator 11).

For example, a known technique for displaying an OZT (Obstacle Zone by Target) is used for the calculation of the risk value. According to this technique, for each of a plurality of determination points set on an estimated course of another ship, the risk of a collision between the ship and another ship may be evaluated when the ship is assumed to change a course and reach the determination point.

Without being limited to this configuration, for example, a technique using TCPA (Time to Closest Point of Approach)/DCPA (Distance to Closest Point of Approach) may be applied to the calculation of the risk value, or a technique using an SJ (Subject Judgment) value may be applied.

Next, the information processing device 1 may determine whether the plurality of other ships are a convoy based on the other-ships data (S12: processing as the convoy determinator 12). In detail, among the detected other ships, the information processing device 1 may group a plurality of other ships which are similar to each other, for example, in the position, the speed, and the heading, as a convoy. For example, the information processing device 1 may group, as a convoy, a plurality of other ships which are located within a given range centering on the ship, among which differences in the position and velocity are below given values, and which continue in the state for above a given period of time.

If it is determined that the plurality of other ships are a convoy (S12: YES), the information processing device 1 may select a maximum value from the risk values calculated for the plurality of other ships determined to be the convoy (S13: processing as the representative value selector 13). Without being limited to the maximum value, other representative values, such as an average value, may be selected.

In detail, the information processing device 1 may select the maximum value from the risk values of other ships to which the same convoy identifier is given in the convoy management database (see FIG. 5). In the example of FIG. 7, the risk value of another ship located at the leftmost among three other ships determined to be the convoy is 0.7, which is the maximum value.

Next, if the maximum value of the risk value is above a threshold, the information processing device 1 may issue an alarm for a convoy (S14 and S15: processing as the issuance determinator 15). That is, if at least one of the plurality of other ships determined to be the convoy has a risk value above the threshold, an alarm for a convoy may be issued.

Issuing an alarm for a convoy may mean issuing an alarm for all of the plurality of other ships determined to be the convoy. That is, among the plurality of other ships determined to be the convoy, an alarm may be issued not only for another ship with the maximum risk value, but also for the rest of other ships. Thus, even if another ship solely has the risk value below the threshold like another ship located at the rightmost in the example of FIG. 7, if it is determined to be a convoy, an alarm may be issued.

The issuance of the alarm is realized, for example, by the display unit 2 which also serves as the alarm part 8 changing the color of or blinking symbols of the plurality of other ships determined to be the convoy, or performing an exaggerating indication, such as adding a frame or box indicative of a target to be alarmed.

According to the procedure described above, since the alarm is issued for the whole convoy, it becomes easier to take an avoidance maneuver to avoid the whole convoy.

Note that, if it is determined that the plurality of other ships are not a convoy, (S12: NO), the information processing device 1 may determine whether an alarm is to be issued (issuance determination) individually for each of other ships. That is, if they are determined to be a convoy, the issuance determination may be performed for the convoy as described above, and if they are determined not to be a convoy, the issuance determination may be performed individually for each of other ships similarly to the conventional way.

Figure 8:
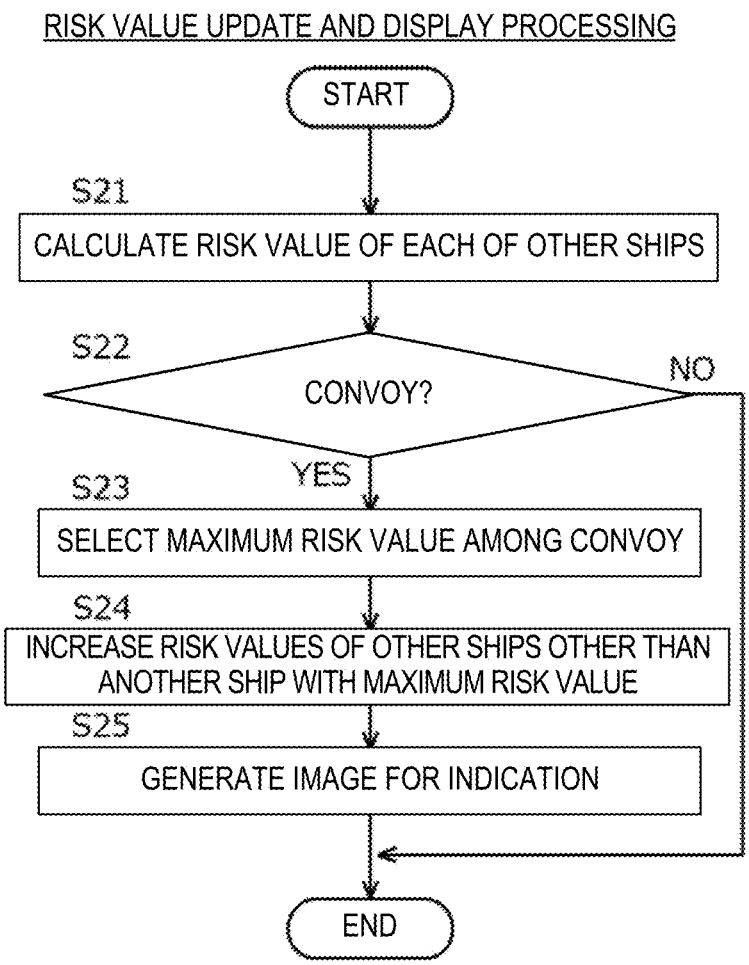
FIG. 8 is a view illustrating one example of a procedure of risk value update and display processing.
Figure 9:
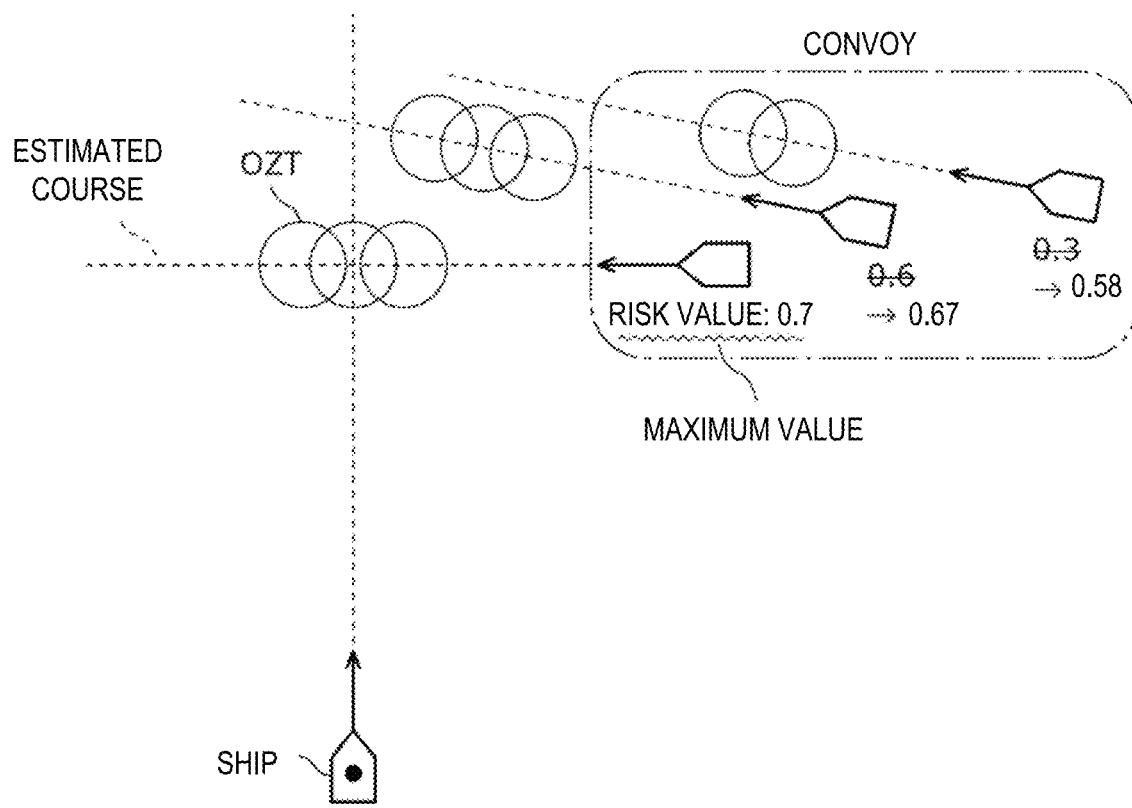
FIG. 9 is a view illustrating one example of a risk value update.
Figure 10:
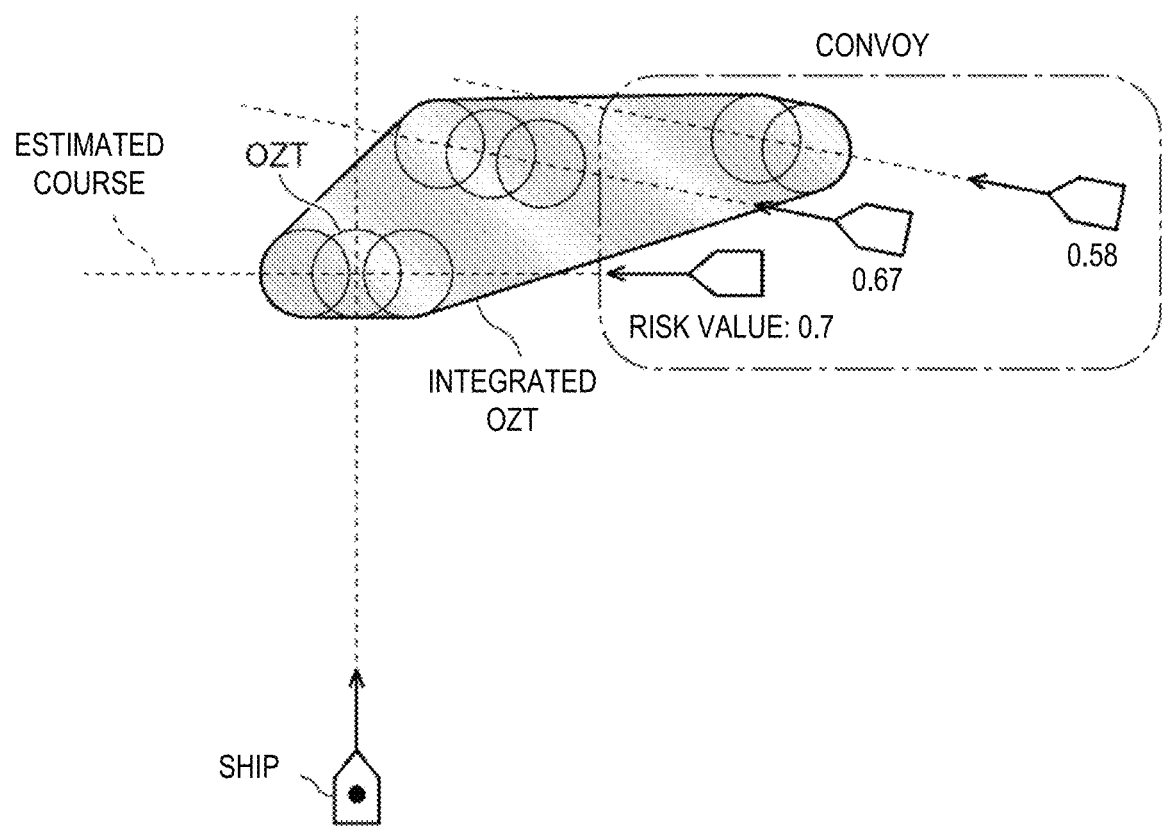
FIG. 10 is a view illustrating one example of indication.

FIG. 8 is a flowchart illustrating one example of a procedure of risk value update and display processing among a ship monitoring method according to one embodiment implemented by the ship monitoring system 100. The information processing device 1 may perform information processing illustrated in this drawing according to the program. FIG. 9 is a view illustrating one example of a risk value update. FIG. 10 is a view illustrating one example of indication.

First, the information processing device 1 may calculate a risk value of a collision between the ship and each of a plurality of other ships, determine whether the plurality of other ships are a convoy, and select the maximum value from the risk values calculated for the plurality of other ships determined to be the convoy (S21 to S23). This processing may be similar to that of S11 to S13 described above.

Next, the information processing device 1 may increase the risk values of other ships other than another ship with the maximum risk value, among the plurality of other ships determined to be the convoy (S24: processing as the risk value updater 14).

In detail, the information processing device 1 may increase the risk values of other ships other than another ship with the maximum risk value (hereinafter, referred to as "other ship(s) to be updated") within a range not exceeding this maximum value to have correction for the risk values recorded on the convoy management database (see FIG. 5).

A risk value after a correction of other ships to be updated may be calculated by the following weighted average, for example:

$$\text{Corrected risk value} = (0.7 \times \text{maximum risk value}) + (0.3 \times \text{risk value of other ship to be updated}).$$

Note that the correction technique and a weighting factor are not limited to this configuration.

In the example of FIG. 9, the risk value of another ship located at the leftmost among the three other ships determined to be the convoy is 0.7 which is the maximum value. The risk value of another ship located at the center is 0.6, and the risk value of another ship located at the rightmost is 0.3, and these ships are other ships to be updated.

By updating the risk values of the other ships to be updated according to the above-described formula, the risk value of another ship located at the center increases from 0.6 to 0.67, and the risk value of another ship located at the rightmost increases from 0.3 to 0.58.

According to this method, even if another ship has the risk value below the threshold before the update, like another ship located at the rightmost in the example of FIG. 9, the risk value may be increased by another ship being determined to constitute the convoy. Therefore, the alarm becomes easier to be issued.

Next, the information processing device 1 may generate an image for indication, and output it to the display unit 2 (S25: processing as the display controller 16).

FIG. 10 is a view illustrating one example of the image for indication displayed on the display unit 2. In the image for indication, the plurality of other ships determined to be the convoy may be discriminatingly indicated. That is, the plurality of other ships belonging to the convoy may be displayed so as to be discriminable from other ships which do not belong to the convoy. For example, the plurality of other ships determined to be the convoy may be surrounded by a frame or box indicative of the convoy as illustrated in this drawing, or may be changed in the color.

Further, in the image for indication, although an OZT is placed on an estimated route of each of the plurality of other ships determined to be the convoy, these OZTs may be displayed integrally. In detail, an integrated OZT which surrounds the plurality of OZTs may be displayed. The integrated OZT may be formed by connecting tangents of the plurality of OZTs so that the area becomes the maximum, for example.

Thus, by discriminatingly indicating the plurality of other ships determined to be the convoy, it is easier to visually recognize the convoy. Further, by displaying the integrated OZT, it becomes easier to visually recognize a travelable area for avoiding the convoy.

Although one embodiment of the present disclosure is described above, the present disclosure is not limited to the above embodiment, and it is needless to say that various changes are possible for the person skilled in the art.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

1 Information Processing Device, 2 Display Unit, 3 Radar, 4 AIS, 5 GNSS Receiver, 6 Gyrocompass, 7 ECDIS, 8 Alarm Part, 10 Processing Circuitry 11 Risk Value Calculator, 12 Convoy Determinator, 13 Representative Value Selector, 14 Risk Value Updater, 15 Issuance Determinator, 16 Display Controller, 100 Ship Monitoring System

The invention claimed is:

1. A ship monitoring system, comprising:
a first data generator configured to generate first ship data indicative of a position and a velocity of a first ship; and
a second data generator configured to generate a plurality of second ship data indicative of positions and velocities of a plurality of second ships;
processing circuitry configured to:
calculate a risk value indicative of a risk of a collision between the first ship and each of the plurality of second ships based on the first ship data and the plurality of second ship data,
determine whether the plurality of second ships are a convoy based on the plurality of second ship data, and
select a representative value from the risk values calculated for the plurality of second ships determined to be the convoy.

2. The ship monitoring system of claim 1, further comprising an alarm part configured to issue an alarm for the plurality of second ships determined to be the convoy, when any of the risk values calculated for the plurality of second ships determined to be the convoy is above a threshold.

3. The ship monitoring system of claim 1, wherein the processing circuitry further configure to increase the risk values of the second ships other than the second ship with the maximum risk value, among the plurality of second ships determined to be the convoy.

4. The ship monitoring system of claim 3, wherein the processing circuitry increases the risk values of the second ships other than the second ship with the maximum risk value, within a range not exceeding the maximum value.

5. The ship monitoring system of claim 4, further comprising a display unit configured to discriminatingly indicate the plurality of second ships determined to be the convoy.

6. The ship monitoring system of claim 4, further comprising a display unit configured to integrally display OZTs (Obstacle Zones by Target) disposed on estimated courses of the plurality of second ships determined to be the convoy.

7. The ship monitoring system of claim 4, wherein the processing circuitry determines the plurality of second ships to be the convoy, when differences of the positions and the velocities of the plurality of second ships are below given values, and this state continues for above a given period of time.

8. The ship monitoring system of claim 1, further comprising a display unit configured to discriminatingly indicate the plurality of second ships determined to be the convoy.

9. The ship monitoring system of claim 1, further comprising a display unit configured to integrally display OZTs (Obstacle Zones by Target) disposed on estimated courses of the plurality of second ships determined to be the convoy.

10. The ship monitoring system of claim 1, wherein the processing circuitry determines the plurality of second ships to be the convoy, when differences of the positions and the velocities of the plurality of second ships are below given values, and this state continues for above a given period of time.

11. The ship monitoring system of claim 10, further comprising an alarm part configured to issue an alarm for the second ship having the representative value and the rest of the second ships, among the plurality of second ships determined to be the convoy.

12. The ship monitoring system of claim 1, further comprising an alarm part configured to issue an alarm for the second ship having the representative value and the rest of the second ships, among the plurality of second ships determined to be the convoy.

13. The ship monitoring system of claim 1, wherein the first data generator includes a GNSS receiver mounted on the first ship and configured to detect the position of the first ship based on a radio wave received from a GNSS (Global Navigation Satellite System).

14. The ship monitoring system of claim 1, wherein the second data generator includes a radar mounted on the first ship and configured to detect the position and the velocity of the second ship based on echo data generated by receiving a reflection wave of the radio wave transmitted around the first ship.

15. A ship monitoring method, comprising the steps of:
generating, by a first data generator, first ship data indicative of a position and a velocity of a first ship;
generating, by a second data generator, a plurality of second ship data indicative of positions and velocities of a plurality of second ships;
calculating a risk value indicative of a risk of a collision between the first ship and each of the plurality of second ships based on the first ship data and the plurality of second ship data;
determining whether the plurality of second ships are a convoy based on the plurality of second ship data; and
selecting a representative value from the risk values calculated for the plurality of second ships determined to be the convoy.

16. An information processing device, comprising:
processing circuitry configured to:
calculate a risk value indicative of a risk of a collision between a first ship and each of a plurality of second ships based on first ship data indicative of a position and a velocity of the first ship, and a plurality of second ship data indicative of positions and velocities of the plurality of second ships,
determine whether the plurality of second ships are a convoy based on the plurality of second ship data; and
select a representative value from the risk values calculated for the plurality of second ships determined to be the convoy.

* * * * *